Jan. 27, 1953   F. R. CHESTER   2,626,526
ADJUSTABLE MEASURING VESSEL
Filed May 23, 1950
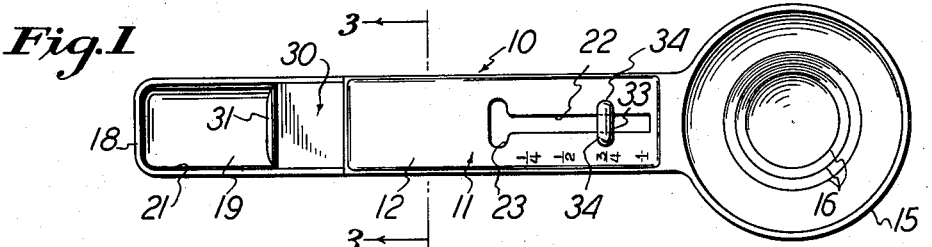
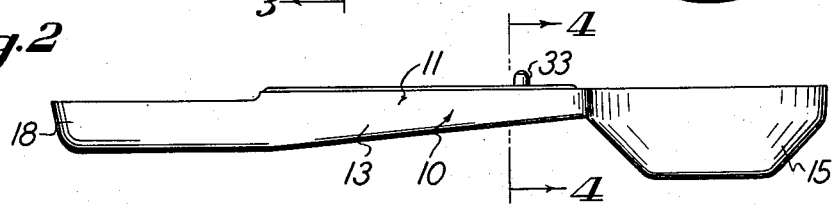
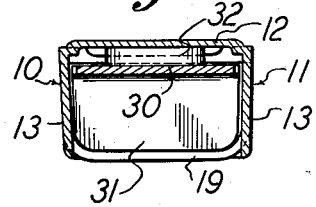
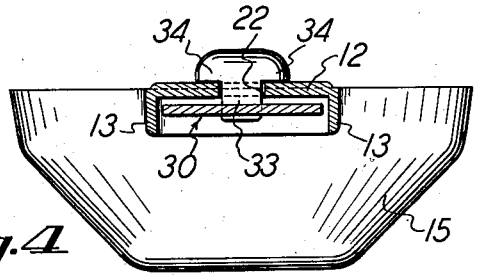
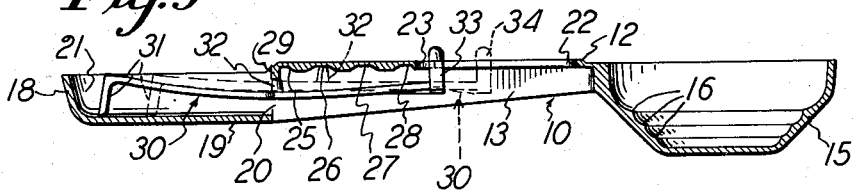
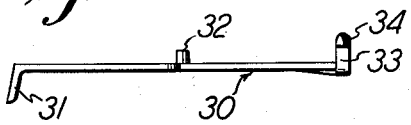
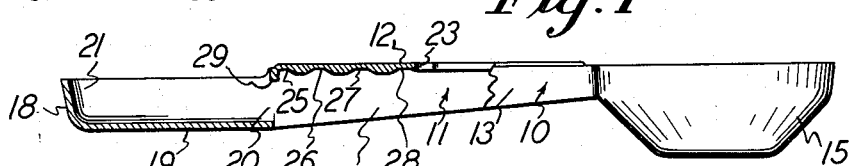
INVENTOR
F. R. CHESTER.
BY William E. Hall
ATTORNEY Patented Jan. 27, 1953

2,626,526

UNITED STATES PATENT OFFICE 2,626,526

ADJUSTABLE MEASURING VESSEL

Frank R. Chester, Santa Monica, Calif.

Application May 23, 1950, Serial No. 163,773

7 Claims. (Cl. 73—429)

This invention relates to measuring devices, and particularly to a device adapted for use in measuring selected, relatively small amounts of loose material, such as ingredients used in cooking and for other purposes.

Various devices have been employed in the past for measuring or metering small amounts of loose, powdery material, one such device being disclosed in my Patent, No. 2,496,268, for Adjustable Measuring Receptacle, issued February 7, 1950. Such devices are of the adjustable type capable of measuring desired amounts of the loose material. While these adjustable devices are quite efficient in performing their intended function they have several disadvantages, one of which is that they are constructed from metal parts which must be fabricated from sheet metal and assembled by separate fastening elements or by bending the metal to provide interengaging connector portion. Such a method of constructing and assembling the components results in a relatively expensive cost of manufacture and in addition, unless the parts are made from costly stainless metal, they are subject to corrosion which eventually renders the measuring devices unsuitable for use. Moreover, since the parts are permanently connected, they cannot be disassembled for the purpose of cleaning the same. For this reason it is practically impossible to cleanse the device thoroughly in order to remove material which accumulates between the relatively movable elements, and this results in an unsanitary condition.

It is therefore an object of the present invention to obviate the deficiencies of prior adjustable measuring devices by providing a device of this general character which is constructed entirely from molded plastic material so as to greatly minimize the cost of manufacture. A related object is to provide a device of the type specified which is composed of only two relatively simple components adapted for economical mass production methods of manufacture.

Another object is to provide a device, of the character referred to, in which the two parts are releasably retained in assembled relation by interengaging portions of the parts themselves so that the use of extraneous mechanical fastening elements for the purpose is avoided. By this provision the cost of assembling the device is reduced to a minimum, and this results in a substantial saving to the buyer. Another important advantage of this construction resides in the fact that the device may be readily assembled and disassembled by the user, so that the parts can be thoroughly cleansed following each use of the device and subsequently assembled for use at a later time.

Another object of the invention is to provide an adjustable measuring device in which the parts are slidable longitudinally relative to each other so as to vary the capacity of a scoop or receptacle at one end of the device. A related object is to provide an extremely simple means for releasably retaining the elements in their adjusted positions, this means consisting of interengaging detent means on the elements which are held in engagement by the resiliency of one of the elements. In the present device, the detent means is entirely concealed from view and this is another important feature and object of the invention, since it greatly enhances the appearance of the article as a whole and adds to its salability.

A further object is to provide a device of the type indicated which measures desired amounts of material with accuracy, and which includes means for indicating the volume of material scooped up by the device, the pointer of this indicating means being embodied in the means for retaining the elements in assembled relationship.

Further objects will appear from the following description and from the drawing, which illustrates a preferred embodiment of the invention, as illustrated by the accompanying drawing. In the drawing:

Fig. 1 is a plan view of the adjustable measuring device;

Fig. 2 is a side view of the same;

Fig. 3 is a cross-sectional view, taken on line 3—3 of Fig. 1;

Fig. 4 is an enlarged cross-sectional view, taken on line 4—4 of Fig. 2;

Fig. 5 is a longitudinal sectional view of the device, showing in full lines the manner in which the adjustable member is inserted and removed from the handle member, and indicating in broken lines one operative position assumed by the member;

Fig. 6 is a side view of the adjusting member;

Fig. 7 is a part-sectional side view of the handle member; and,

Fig. 8 is a fragmentary longitudinal sectional view of an alternative construction.

Referring to the drawing in detail, the present improved measuring device includes a handle member 10 which is preferably molded from a suitable plastic material. The handle member 10 has a central portion 11 of inverted channel shape, this portion having a top wall 12 and depending parallel side walls 13.

Molded integrally with the portion 11 at one end thereof is a bowl-like scoop 15 which preferably has a capacity of one tablespoon. At its lower tapered portion the scoop 15 has circular ridges or steps 16 on its interior for indicating fractions of a tablespoon.

At the other end of the handle member 10 the side walls 13 are extended longitudinally and are joined by a rearward end wall 18. A bottom wall 19 extends between the projected side walls 13, the bottom wall terminating at a point below the rearward end of the top wall and defining therewith a vertical opening 20. The projected side walls 13, the end wall 18, and the bottom wall 19 define a rectangularly shaped receptacle or scoop 21, the forward end of which is formed by means to be presently described. The central portion 11 of the handle member 10 is provided with an elongated opening 22 in its top wall 12, the opening extending forwardly from the mid portion of the wall 12 to a point adjacent the juncture of the central portion 11 and the tablespoon scoop 15. As shown in Fig. 1, the rearward end of the opening 22 has a widened portion 23 at its rearward end. Molded graduations ¼, ½, ¾, and 1 (full teaspoon) are provided on the upper surface of the top wall 12. Referring now to Figs. 5 and 7, the lower surface of the top wall 12 rearwardly of the opening 22, 23 is provided with four longitudinally spaced indentations or detent notches 25, 26, 27, and 28. The top wall 12 is also provided with a downwardly projecting stop lug 29 at its rearward end.

The adjustable measuring device also includes a member 30 which consists of a molded strip of flexible plastic material, the strip being bowed upwardly at its ends. At its rearward end, the strip 30 has a downwardly projecting flange 31 which is dimensioned to adapt it to fit within the scoop 21 so as to provide the adjustable forward wall thereof in the manner to be later explained. At its mid portion the member 30 has an upstanding lug projection or abutment 32. The member 30 also has an upwardly projecting lug 33 at its forward end, the lug being T-shaped in outline to provide laterally projecting lugs 34.

The two members 10 and 30 constitute the only parts of the present improved measuring device. To assemble these components, the flanged end 31 of the member 30 is inserted into the receptacle 21 in a rearward direction through the opening 20. The member 30 is then slid rearwardly to align its lug 33 with the widened portion 23 of the opening 22. At this time the lug of the member 30 is disposed just rearwardly of the rearward end of the top wall 12. By pressing the forward end of the member 30 upwardly and depressing its central portion, and simultaneously sliding the member 30 forwardly, the lug 33 is caused to enter the narrow portion of the opening 22 and the detent projection 32 moves forwardly under the stop lug 29, this condition being shown in full lines in Fig. 5. As the projection 32 moves forwardly beyond the stop lug 29, it snaps upwardly, due to the inherent flexibility of the member 30 and comes to rest in the first detent notch 25 of the handle member 10. The projection 32 serves to spring the central portion of the member 30 downwardly and, since the fingers 34 engage the handle 11, the flange 31 is maintained in engagement with the bottom wall 19. At this time the lug 33 of the member is disposed in alignment with the graduation "¼" and this signifies that the volume of the portion of the scoop or receptacle 21 defined between the end wall 18 and the adjustable flange 31 is equal to ¼ teaspoon.

Thus, if it is desired to measure and dispense a quarter of a teaspoon of loose material, the receptacle 21 is used to scoop up the desired quantity from the container of material, the latter being subsequently levelled along the top of the receptacle before dispensing the same. If a half teaspoon of the material is desired the member is merely slid forwardly, by pressing against the lug 33, until the detent projection 32 snaps into the detent notch 26, as shown by broken lines in Fig. 5, at which time the lug 33 registers with the graduation "½". If other increased amounts of the loose material are to be measured and dispensed, the member 30 is slid further in a forward direction to space its flange 31 at a greater distance from the end wall 18 so as to increase the effective volume of the scoop or receptacle 21. It is to be noted that the sides of the notches 25 to 28 are rounded slightly to facilitate the adjustment of the measuring member along the handle member. The projection 32 is yieldingly retained in the notches 25 to 28 due to the resilient nature of the member 30 so that undesired longitudinal movement of the latter is effectively resisted.

It has been stated that the present device is adapted to be readily disassembled for cleaning purposes. To accomplish this desirable result, the assembly process explained above is reversed. That is to say, the member 30 is slid rearwardly and bowed downwardly to cause its projection 32 to pass beneath the stop lug 29 and to disengage its lug 33 from the handle member 10 by way of the widened portion 23 of the opening 22. The member 30 then may be completely removed by sliding it forwardly to remove its flange 31 from the receptacle 21.

Referring now to Fig. 8, the present invention also contemplates the alternative construction shown therein. In this modification, the member 30' carries a rivet-like fastening element 40 which has a shank portion 41 slidable longitudinally within an elongated opening 22' provided in the top wall 12' of the handle member 10'. The member 30' has a flange 31' which forms the front wall of the receptacle 21' and which is slidable longitudinally to vary the capacity of the receptacle. An upwardly projecting protuberance 42 on the member is adapted to snap into any of a series of longitudinally spaced indentations 43 provided in the lower surface of the top wall 12' of the handle member 10'. As in the device illustrated in Figs. 1 through 7, the member 30' may be flexible to maintain its flange 31' seated against the bottom wall of the receptacle 21'. The element 40 has a rounded head 44 which engages against the top surface of the handle member to retain the parts in connected relationship, this head serving as a finger-piece by which the member can be slid longitudinally.

It is seen from the foregoing description that the present adjustable measuring device is extremely simple in construction, being composed of only two parts, each of which is adapted for economical mass production by plastic molding operations. Since the two components are quickly assembled without expert fitting and without the use of screws, rivets, or other mechanical fastening means, the over-all cost of the article is maintained at a minimum. The device is highly efficient and accurate in measuring desired quantities of loose bulk material, and is easily operated. As an important feature, the two parts of the device are made from light-weight plastic material which is readily disassembled to permit such cleaning, so that material which may accumulate between the components can be easily washed away to render the device completely sanitary.

While the device is herein disclosed as embodied in a preferred form of construction, by way of example, it will be apparent that various modifications might be made in the construction without departing from the spirit of the invention.

I claim as my invention:

1. An adjustable measuring device, comprising: a handle member provided with an elongated receptacle at one end, said receptacle having a wall at one end and an opening at its other end; a flexible adjusting member adjustable longitudinally along said handle member and extending through said opening, said adjusting member having a transverse flange disposed within said receptacle, said flange being adapted, when said adjusting member is adjusted longitudinally, to vary the volume of said receptacle defined between said wall and said flange; and lug means on said adjusting member engaging said handle member and flexing said adjusting member, so as to retain said flange within said receptacle and to provide frictional resistance to sliding movement of said adjusting member.

2. An adjustable measuring device, comprising: a handle member provided with an elongated receptacle at one end, said receptacle having a wall at one end and an opening at its other end; a flexible adjusting member adjustable longitudinally along said handle member and extending through said opening, said adjusting member having a transverse flange disposed within said receptacle, said flange being adapted, when said adjusting member is adjusted longitudinally, to vary the volume of said receptacle defined between said walls and said flange; lug means on said adjusting member engaging said handle member and flexing said adjusting member so as to retain said flange within said receptacle and to provide frictional resistance to sliding movement of said adjusting member, and detent means on said handle member for retaining said adjusting member in different positions of longitudinal adjustment.

3. An adjustable measuring device, comprising: a handle member provided with an elongated receptacle at one end, said receptacle having a wall at one end and an opening at its other end; a flexible adjusting member adjustable longitudinally along said handle member and extending through said opening, said adjusting member having a transverse flange disposed within said receptacle, said flange being adapted, when said adjusting member is adjusted longitudinally, to vary the volume of said receptacle defined between said wall and said flange; lug means on said adjusting member engaging said handle member and flexing said adjusting member, so as to retain said flange within said receptacle and to provide frictional resistance to sliding movement of said adjusting member; and longitudinally spaced detent depressions on said handle member for receiving said lug means so as to yieldingly retain said adjusting member in different positions of longitudinal adjustment.

4. An adjustable measuring device, comprising: a handle member provided with an elongated receptacle at one end, said receptacle having a wall at one end and an opening at its other end; a flexible adjusting member adjustable longitudinally along said handle member and extending through said opening, said adjusting member having a transverse flange disposed within said receptacle, said flange being adapted, when said adjusting member is adjusted longitudinally, to vary the volume of said receptacle defined between said wall and said flange; lug means on said adjusting member engaging said handle member and flexing said adjusting member, so as to retain said flange within said receptacle and to provide frictional resistance to sliding movement of said adjusting member; longitudinally spaced detent depressions on said handle member for receiving said lug means so as to yieldingly retain said adjusting member in different positions of longitudinal adjustment; and indicator means on said adjusting member registrable with graduations on said handle member.

5. An adjustable measuring device, comprising: a handle member of inverted channel shape having a top wall and depending side walls, said top wall having an elongated opening therein, said member having an elongated measuring receptacle disposed beyond an end of said top wall, said receptacle being defined by continuations of said side walls, a bottom wall and a rearward end wall; a flexible adjusting member having a first end slidable longitudinally within said receptacle and having an angularly extending flange providing an adjustable front wall for said receptacle, said adjusting member having a second end underlying said handle member and provided with an upstanding guide slidable in said elongated opening; retaining means on said guide means engaging said handle member for retaining said guide in said opening; and a projection on said adjusting member intermediate its ends, said projection engaging against the bottom surface of said handle member and slidable therealong, said engagement effecting bowing of said adjusting member downwardly and providing frictional resistance to sliding movement thereof, sliding movement of said adjusting member varying the volume of the portion of said receptacle between said fixed rearward wall and said longitudinally adjustable front wall.

6. A device of the character defined in claim 5, in which said guide has laterally projecting fingers engaging the upper surface of said handle member along the longitudinal edges of said opening.

7. A device of the character defined in claim 5, in which said guide has laterally projecting fingers engaging the upper surface of said handle member along the longitudinal edges of said opening, said opening having a widened portion at its end nearest said receptacle through which said guide can move vertically to permit mounting of said measuring member on and removal from said handle member.

FRANK R. CHESTER.

REFERENCES CITED

The following references are of record in the file of this patent:

UNITED STATES PATENTS

| Number | Name | Date |
|---|---|---|
| 808,967 | Arrowsmith | Jan. 2, 1906 |
| 2,165,642 | Mayer | July 11, 1939 |
| 2,396,943 | Frank | Mar. 19, 1946 |
| 2,496,268 | Chester | Feb. 7, 1950 |